340-566 SR
XR 3,710,336

United States Patent [19]
Lerner
[11] 3,710,336
[45] Jan. 9, 1973

[54] SIGNAL-RESPONSIVE CONTROL SYSTEM

[75] Inventor: Julius O. Lerner, Verona, N.J.

[73] Assignee: David Herman, Livingston, N.J. ; a part interest

[22] Filed: Oct. 2, 1969

[21] Appl. No.: 863,258

[52] U.S. Cl. ..................343/225, 325/113, 340/171, 340/258, 340/261

[51] Int. Cl. ..............................................G08b 13/22

[58] Field of Search..............340/258, 147, 261, 171; 325/113; 179/84 UF; 343/225

[56] References Cited

UNITED STATES PATENTS

| | | | |
|---|---|---|---|
| 2,907,012 | 9/1959 | Pitman | 340/261 |
| 3,061,829 | 10/1962 | Roberts | 340/258 |
| 3,487,396 | 12/1969 | Perelman | 340/261 |
| 3,487,397 | 12/1969 | Kaplan | 340/361 |
| 3,564,501 | 2/1971 | Flook | 340/171 PF |

*Primary Examiner*—Robert L. Griffin
*Assistant Examiner*—Joseph A. Orsino, Jr.
*Attorney*—William R. Liberman

[57] ABSTRACT

An actuating system responsive to a predetermined frequency includes a network for preventing actuation by noise, unauthorized, or spurious signals, which network includes a filter which passes frequencies in other than the predetermined frequency. The filter passed signal is demodulated and applies as a disabling signal to the system actuator network. Where the system is a sonic type intruder detector the filter-passed signal is also demodulated by a second rectifier and charges a capacitor whose output is applied to the actuator network and after a predetermined charging interval is sufficient to trigger the network. In a door or function actuating system, the actuator network is disabled by a signal of other than the predetermined frequency for an extended interval following its application.

4 Claims, 4 Drawing Figures

INVENTOR
JULIUS O. LERNER
BY
William R. Liberman
ATTORNEY

INVENTOR
JULIUS O. LERNER
BY William R. Liberman
ATTORNEY

INVENTOR
JULIUS O. LERNER
BY William R. Liberman
ATTORNEY

SIGNAL-RESPONSIVE CONTROL SYSTEM

BACKGROUND OF THE INVENTION

The present invention relates generally to improvements in signal responsive control systems and it relates particularly to an improved control network responsive to a signal of predetermined frequency, such as many intruder alarm systems, remote-controlled door operating mechanisms, and the like.

There have been many types of sonic intruder or motion detection systems proposed and available which utilize different principals and phenomena such as the Doppler effect, changes in an established standing wave, sonic wave phase changes or transit time changes. Some examples of such intruder detector systems are disclosed in U.S. Pat. No. 3,438,020 granted April 8, 1969, to Julius O. Lerner and in copending U.S. Pat. application Ser. No. 720,050, filed April 10, 1968 now U.S. Pat. No. 3,597,754. While the intruder or motion detection systems are immune to noise interference and spurious other signals at frequencies remote from the system operating frequency, they are highly susceptible to broadband noise and other signals which include the operating frequency and close adjacent frequencies. Doppler systems are vulnerable since the passband of its receiver necessarily must be broad enough to receive the motionally caused other frequencies reflected from a moving object. In the case of a standing wave system noise frequencies slightly different from the operating frequency beat with the operating frequency in the demodulator and produce low frequency products which resemble a true motionally produced signal. Even of the pick-up transducer and receiving amplifier are sharply frequency selective, false operation can still be caused by a noise source such as a ringing telephone because the vibrating bell produces a broad spectrum of noise well into the ultrasonic range, and the many frequencies mechanically modulate each other so that the particular portion of noise at operating frequency arrives at the pick-up transducer already modulated.

The less expensive sonic- or tone-modulated radio frequency remote control systems are also subject to false operation by spurious signals or noise, as well as by purposeful trial and error tampering.

Remote control systems responsive to a signal of a predetermined frequency, for example a remote controlled door opening system, are likewise actuatable by spurious signals, and noise. Moreover, such control systems may be actuated in an unauthorized manner by a broad frequency band generator or by use of a signal of continuously varying frequency which includes the actuating frequency. It is clear from the above that the conventional control networks which are actuated in response to a signal of a predetermined frequency leave much to be desired.

SUMMARY OF THE INVENTION

It is a principal object of the present invention to provide an improved signal responsive control system.

Another object of the present invention is to provide an improved control system responsive to a signal of a predetermined frequency, alone.

Still another object of the present invention is to provide an improved control system responsive to signals of a predetermined frequency, which system is disabled in the presence of signals at frequencies other than said predetermined frequency.

A further object of the present invention is to provide a sonic type moving object detection system which is insensitive to noise and spurious signals of short durations but is actuated in the presence of non-operating frequency signals of a predetermined extended duration.

Still a further object of the present invention is to provide a remote control system responsive to a signal of predetermined frequency, but which is disabled for a predetermined time following the application of a signal at a frequency different from said predetermined frequency.

The above and other objects of the present invention will become apparent from a reading of the following description taken in conjunction with the accompanying drawings which illustrate preferred embodiments thereof.

In a sense, the present invention contemplates the provision of a control system responsive to a signal of a predetermined frequency in which a signal derived from the control system input is passed through a filter which passes all signals except those at said predetermined frequency and means are provided for disabling the control network in response to the signal passed by the filter.

As applied to a sonic type motion detector, the output of the preamplifier is also coupled through a pass filter of the above character to a first demodulator or rectifier whose output charges a capacitor the voltage across which is applied as a cut-off or disabling signal to the detector alarm actuating network. A second demodulator is provided which rectifies part of the output of the filter and charges a timing capacitor whose output is applied to the actuating network to actuate the network even in the presence of the disabling signal derived through the first demodulator. The time required to charge the timing capacitor to an actuating voltage is greater than that required to produce a disabling signal. As applied to a remote-controlled actuating system, a signal derived from the input to the actuating system is passed through a filter which rejects the actuating frequency, and means are provided for disabling the actuating system in response to the signal passed by said filter and for a predetermined period thereafter.

Thus, in the above systems the presence of random or spurious signals or noises does not effect the undesired actuation thereof. However, in the sonic motion detection system where off frequency signals persist for a predetermined time the control circuit is actuated whereas in the remote control system of the second type the signal at a frequency different from the predetermined frequency disables the system for an extended period, thereby preventing the unauthorized actuation thereof by the use of signals of varying frequency.

BRIEF DESCRIPTION OF THE INVENTION

DESCRIPTION OF THE PREFERRED EMBODIMENTS

Figure 1:
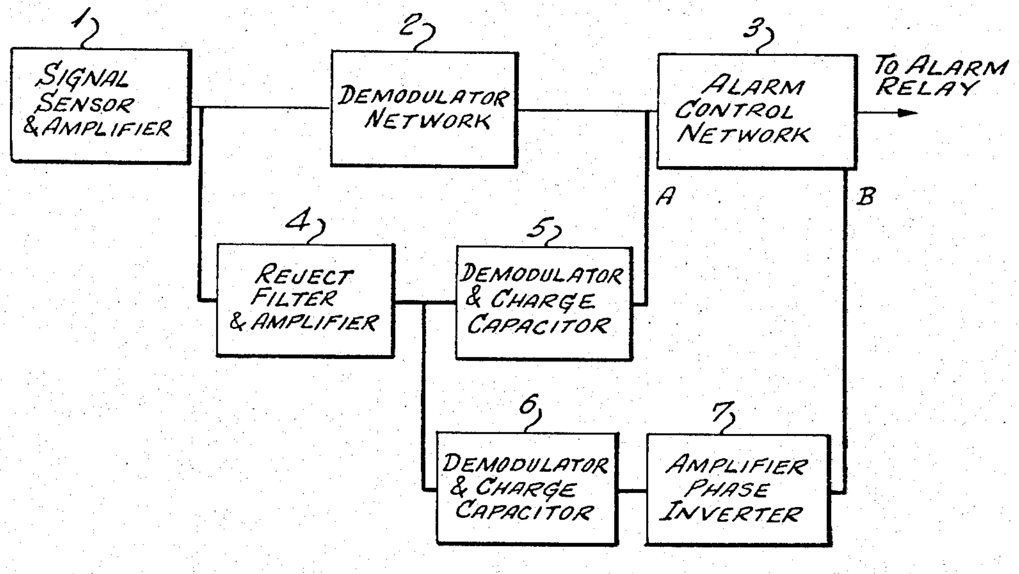
FIG. 1 is a block diagram of a preferred embodiment of the present invention as applied to a sonic type moving object detection system.
Figure 2:
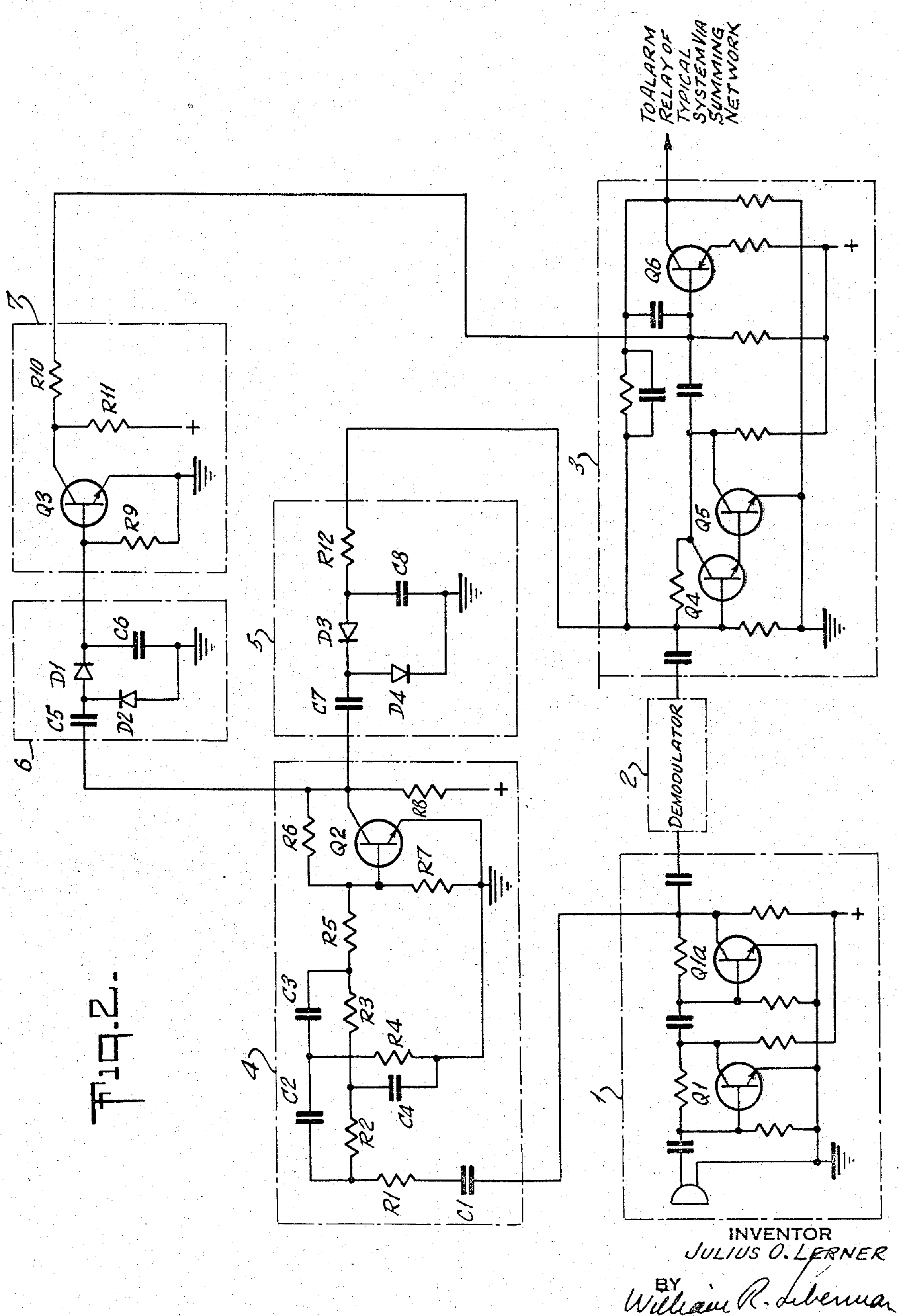
FIG. 2 is a circuit diagram thereof.

Referring now to the drawing, particularly FIGS. 1 and 2 thereof which illustrates a preferred embodiment of the present invention employed in a sonic type moving object detector, reference numerals 1, 2 and 3 generally respectively designate a signal sensing and preamplifier network, a demodulator network and an alarm control or activating network which are of broadly known construction and may correspond respectively, for example, to amplifier 12, demodulator network 13 and switching network 14 disclosed in the above-identified Lerner patent, or to preamplifier 2, demodulator 5 and pulser 6 disclosed in the above-identified Lerner patent application. Associated with the signal sensing network is either a sound generator for producing a single frequency sonic standing wave field which is sensed by a transducer connected to the input of preamplifier network 1 as in the Lerner patent or preamplifier 1 may be a stage in a tuned amplifier network in which regenerative feedback is established through the ambient medium by sonic intercoupling as in the Lerner patent application.

Specifically, sensing and preamplifier network 1 comprises a two stage amplifier including an input NPN transistor Q1 capacitor coupled to an output NPN transistor Q1*a*, a mechanical electrical transducer, such as a microphone, being capacitor coupled to the input of transistor Q1. The output of network 1 as derived from the collector of transistor Q1*a* is capacitor-coupled to a demodulator 2, of the type described in the aforesaid Lerner patent, which includes a pair of rectifier diodes and a charge-accumulating capacitor whose output is capacitor-coupled to the input of the alarm control network 3.

The alarm actuating network 3 comprises a pair of Darlington connected NPN transistors Q4 and Q5 and an opposite type PNP transistor Q6 which are coupled as a regenerative pulse amplifier or generator performing pulse squaring and saturation limiting functions. The collector of transistor Q5 is capacitor-coupled to the base of transistor Q6 and regenerative feedback is effected by a resistor and capacitor in parallel connected between the collector of transistor Q6 and the base of transistor Q4, the base and collector of transistor Q6 being connected by a negative feedback capacitor and the pulse output of network 3 being derived from the collector of transistor Q6.

The output of network 3 controls an alarm or other indicating system either by tripping an alarm control relay or by way of an integrating network as disclosed in the Lerner application, which actuates the network in response to a predetermined number of pulses from network 3 within a predetermined interval.

In order to inhibit the actuation of the alarm control by random noises and spurious signals while effecting the actuation of the alarm control where signals at frequencies different from the operating frequency are present for an interval exceeding a predetermined minimum, there are provided, in accordance with the present invention, a filter and amplifier network 4, a second demodulator and charge network 5, a third demodulator and charge network 6, and a phase-inverting amplifier 7. Network 4 includes a filter which passes frequencies other than the motion sensing sensing network-operating frequency while blocking the operating frequency signal, and an amplifier whose input is derived through the filter and whose output is applied to networks 5 and 6 where the filter passed and amplified signals are demodulated, rapidly to accumulate a sufficient charge on capacitor C8 in network 5 which is applied to network 3 to disable the network, whereas 6 demodulates its input signal and accumulates a charge on capacitor C6 as applied to network 3 sufficient to actuate network 3 after a predetermined interval greater than that required by network 5 to disable network 3. Thus normal random noise or spurious signals will not actuate alarm network 3 whereas an extended signal at a non-operating frequency will actuate the alarm thereby preventing any jamming or tampering with the alarm system.

The filter section of network 4 is of the conventional paraellel T-type, tuned to reject the signals at the sensing or operating frequency and to pass signals at frequencies above and below the operating frequency, although other types of filter may be used. The filter network includes successive series-connected resistors R2 and R3 whose junction is connected to ground through a capacitor C4 and whose outer ends are connected by series-connected capacitors C2 and C3 whose junction point, in turn, is grounded through a resistor R4. The junction of capacitor C2 and resistor R2 is connected through series-connected impedance matching resistor R1 and coupling capacitor C1 to the collector of transistor Q1*a* and the junction of resistor R3, and capacitor C3 is connected through impedance matching resistor R5 to the base of a transistor Q2 which constitutes the amplifier stage of network 4. The base of transistor Q2 is grounded through resistor R7 and is connected to the collector thereof through a biasing resistor R6, the collector being connected to the current source positive terminal through a load resistor R8, and the emitter being directly grounded.

The output of network 4 as derived from the collector of transistor Q2 and applied to the input of network 5 is connected through coupling capacitor C7 to the junction of a pair of diodes D3 and D4, the cathode of diode D4 being grounded and the anode of diode D3 being connected to a first terminal of a charge capacitor C8 whose other terminal is grounded. The ungrounded terminal of capacitor C8 is connected through current limiting and timing resistor R12 to the base of transistor Q4 which base is grounded through a resistor. Thus, the non-operating frequencies passed by the filter network and amplified by transistor Q2 and rectified by diodes D3 and D4 and charge capacitor C8 which, during the presence of such signals and only for a very short interval thereafter, apply a cut-off or disabling signal to transistor Q4, thereby disabling network 3, substantially during the occurrence of interfering signals.

The collector of transistor Q2 is also connected through a coupling capacitor C5 to the junction of diodes D1 and D2 which, with a charge capacitor C6, constitutes network 6. One terminal of capacitor C6 is connected to the anode of diode D2 and is grounded and the other terminal of capacitor C6 is connected to the cathode of diode D1 and to the base of a transistor Q3 of network 7. The emitter of transistor Q3 is grounded and the base thereof is connected through a resistor R9 to ground. The collector of transistor Q3 is connected to the voltage positive terminal through a load resistor R11 and through current limiting resistor R10 to the base of transistor Q6, in network 3.

When a signal of non-operating frequencies, passed and amplified by network 4 and applied to network 6 is of sufficient duration and strength, as determined by the circuit parameters, the demodulated signal charges capacitor C6 to a sufficient positive voltage so that signal derived from the collector of transistor Q3 and applied to the base of transistor Q6 actuates network 3 independently of the signal to its input as derived from networks 2 and 5 thereby to effect the actuation of the alarm or associated indicating system.

Figure 3:
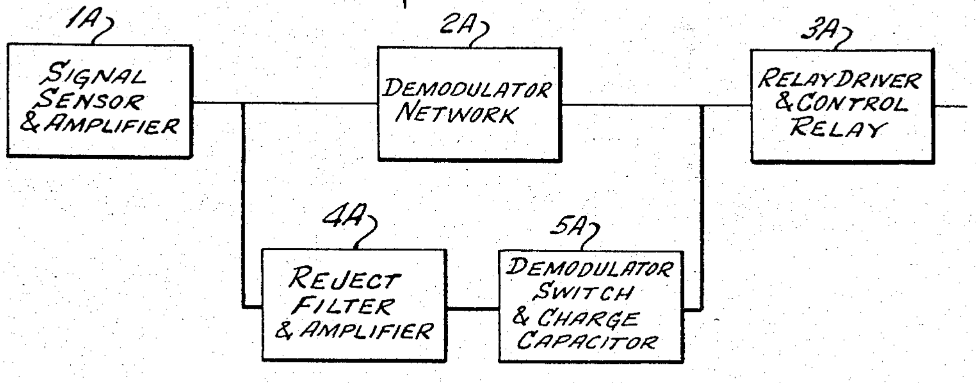
FIG. 3 is a block diagram of another embodiment of the present invention as applied to a sonic signal responsive remote control system.
Figure 4:
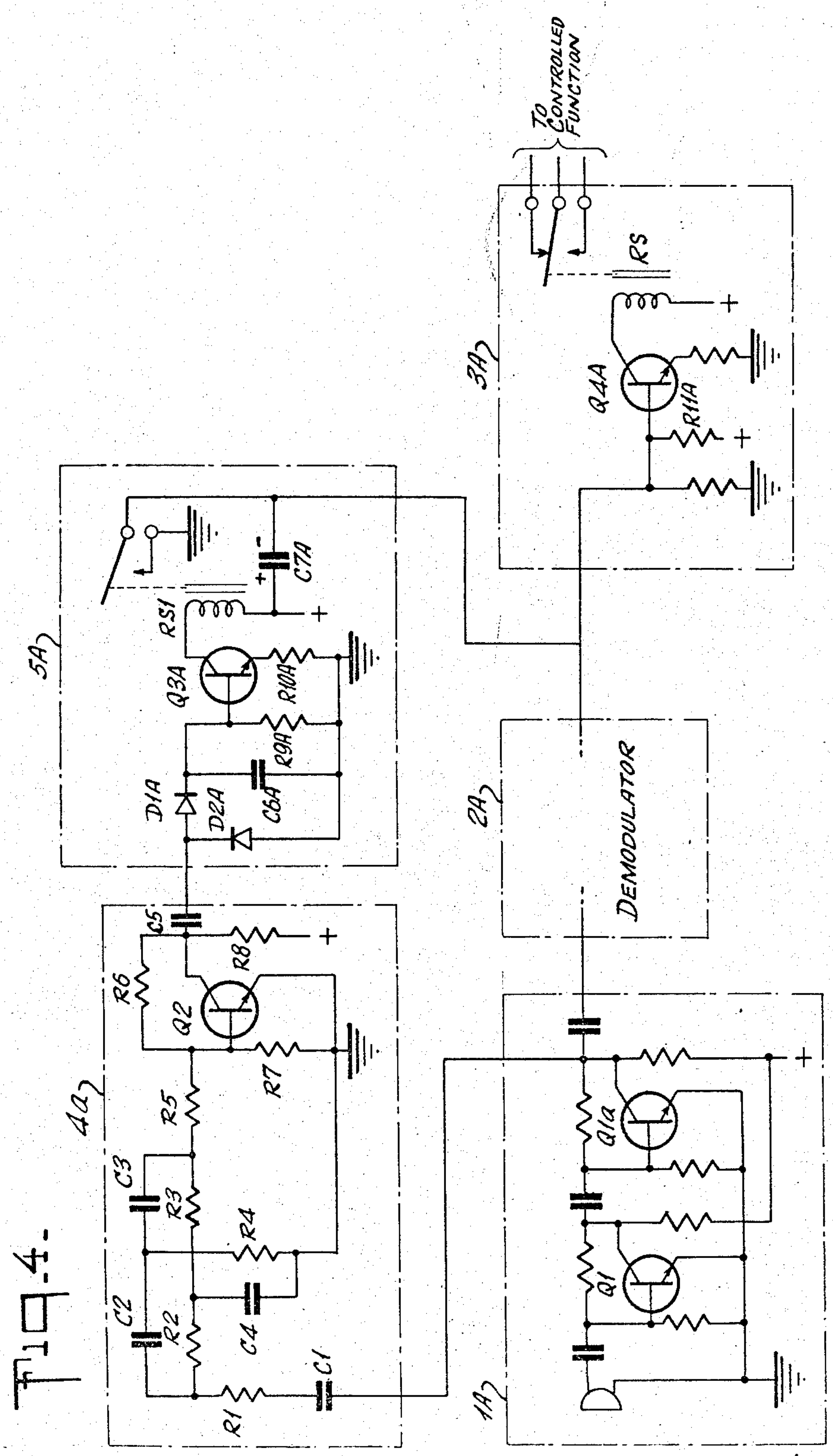
FIG. 4 is a circuit diagram thereof.

In FIGS. 3 and 4 of the drawing there is illustrated another embodiment of the present invention as applied to the remote control of a function or operation, for example, the opening of a garage door or the like, in which a signal of predetermined frequency, which may be a sonic or a radio frequency is employed to control the actuation. The improved system, wherein the same reference numbers are employed to designate similar elements, includes a signal sensing and amplifier network 1A and demodulator network 2A which are similar to networks 1 and 2 previously described. The output of network 2A is connected to the input of a relay driver network and control relay 3A which includes a transistor Q4A whose base is connected to the output of network 2A, and through a base-emitter return resistor to ground and through a biasing resistor R11A to the positive terminal of a power supply. The emitter of transistor Q4A is grounded through a resistor and the collector is connected through the solenoid of control relay RS to the power supply positive terminal. Relay RS, by way of its actuated contacts, controls any desired function, for example a door opening motor, in the known manner.

In order to disable the control network 3A in the presence of noise, spurious signals or any nonoperating frequency signals, the output of network 1A is also applied to the input of a filter and amplifier network 4A which is similar to network 4 previously described. The output of network 4A is capacitor-coupled to the input of a demodulator and disabling signal-generating network 5A which input is to the junction of a pair of diodes D1A and D2A. The cathode of diode D1A is connected to one terminal of a charge capacitor C6A, the other terminal of which is grounded, as is the anode of diode D2A. The ungrounded terminal of capacitor C6A is connected to the base of a transistor relay driver Q3A which is grounded through a base-emitter return resistor R9A shunting capacitor C6A. The emitter of transistor Q3A is grounded through emitter resistor R10A and the collector is connected through the solenoid of a normally open relay switch RS1 to the power supply positive terminal. A charge capacitor C7A is connected between the power supply positive terminal and ground through the contacts of relay switch RS1. The base of transistor Q4A in network 3A is also grounded through relay switch RS1 when RS1 is actuated and connected to the terminal of capacitor C7A opposite that connected to the power supply positive terminal.

Thus, in the presence of a signal of a non-operating frequency, such signal is amplified by network 1A, passed through the filter section of network 4A and amplified by the amplifier stage thereof. The filter-passed amplified signal is then demodulated by diodes D1A and D2A and charges capacitor C6A to a sufficient voltage to render transistor Q3A sufficiently conducting to actuate relay switch RS1 to closed condition. The closing of relay switch RS1 grounds the base of transistor Q4A whose emitter is grounded through an emitter resistor so that the transistor Q4A is substantially non-conductive even in the presence of a signal from network 2A so that the energization and actuation of relay switch RS is prevented. Upon the termination of the non-operating frequency signal, capacitor C6A discharges to render transistor Q3A non-conductive thereby to de-energize and open relay switch RS1. However, a negative signal derived from capacitor C7A is applied to the base of transistor Q4A to maintain it non-conductive even in the presence of an actuating signal so as to prevent the actuation of relay switch RS1. The capacitor C7A discharges through resistor R11A at a rate depending on the time constant of capacitor C7A and resistor R11A and after an interval which is a function of this time constant effects the enablement of network 3A and permits its actuation in response to a signal from network 2A. The duration of the disablement of network 3A following the opening of relay switch RS1 can be as long as desired. During the time inhibit as above determined is in effect, for example 5 to 10 seconds, the control system cannot be actuated by a normal or correct signal. Thus, attempts to find the correct operating frequency by trial or broadband signal only prolong the disable condition. Only the correct signal, free of simultaneous adjacent frequencies, and not shortly preceded by adjacent frequencies, can actuate the remote control system. This is of special security value when the remote control system is used to turn on or turn off from a remote point an intruder detection system, so as to do away with the need for remote control wiring.

While there have been described and illustrated preferred embodiments of the present invention, it is apparent that numerous alternations, omissions and additions may be made without departing from the spirit thereof.

While sonic motion detection and control systems have been described, the same methods can be applied to radio frequency or modulated radio frequency systems, either singly or to both radio and modulation frequency.

I claim:

1. A signal actuated control system comprising an electric signal responsive actuator network, first means responsive to a first signal including a predetermined first frequency for applying an actuating signal to said actuator network and including a first amplifier and a first amplitude demodulator network having an input coupled to the output of said first amplifier and an output coupled to the input of said actuator network, second means responsive to a second signal of a second frequency different from said predetermined frequency for disabling said actuator network and including a second demodulator network and a pass filter blocking signals of said predetermined frequency coupling the output of said first amplifier to the input of said second demodulator, said actuator circuit being disabled in response to the output of said second demodulator network, a third demodulator network coupled to the output of said filter, and means responsive to the output of said third demodulator network for applying an actuating signal to said actuator network.

2. The system of claim 1 wherein said means responsive to the output of said third demodulator network applies an actuating signal to said actuator network upon an input to said third demodulator network exceeding a predetermined minimum duration.

3. The system of claim 1 wherein said means responsive to the output of said third demodulator network responds to an input to said third demodulator network exceeding a predetermined minimum duration and greater than that required by said second demodulator network for disabling said actuation network.

4. A signal actuated control system comprising an electric signal responsive actuator network, first means responsive to a first signal including a predetermined first frequency for applying an actuating signal to said actuator network and including a first amplifier and a first amplitude demodulator network having an input coupled to the output of said first amplifier and an output coupled to the input of said actuator network, second means responsive to a second signal of a second frequency different from said predetermined frequency for disabling said actuator network and including a second demodulator network and a pass filter blocking signals of said predetermined frequency coupling the output of said first amplifier to the input of said second demodulator, said actuator circuit being disabled in response to the output of said second demodulator network, and means for disabling said actuator network for a predetermined interval following the discontinuance of a disabling output from said second demodulator.

* * * * *